United States Patent [19]

Hägeli et al.

[11] Patent Number: 5,627,723
[45] Date of Patent: May 6, 1997

[54] EARTHQUAKE PROTECTION DEVICE FOR A GAS-INSULATED SWITCHING INSTALLATION

[75] Inventors: Heinz Hägeli, Würenlos; Karel Spicak, Zürich, both of Switzerland

[73] Assignee: Asea Brown Boveri AG, Baden, Switzerland

[21] Appl. No.: 412,922

[22] Filed: Mar. 29, 1995

[30] Foreign Application Priority Data

Apr. 19, 1994 [CH] Switzerland .................... 1215/94

[51] Int. Cl.⁶ .................................................. H02B 5/00
[52] U.S. Cl. .................... 361/602; 200/301; 248/676; 361/810
[58] Field of Search ................... 52/167.1, 167.4; 248/548, 550, 618, 631, 632, 634, 636, 638, 676; 200/301; 174/148, 150; 361/602, 604, 605, 611, 612, 618, 620, 621, 673, 829, 807–810, 832, 830

[56] References Cited

U.S. PATENT DOCUMENTS

| | | | |
|---|---|---|---|
| 3,215,897 | 11/1965 | Hertig | 361/602 |
| 3,794,277 | 2/1974 | Smedley | 248/20 |
| 3,805,118 | 4/1974 | Boney | 317/103 |
| 4,141,054 | 2/1979 | Colaiaco | 361/333 |
| 4,493,009 | 1/1985 | Lorenz | 361/604 |
| 4,826,128 | 5/1989 | Schmeller | 248/669 |
| 4,862,319 | 8/1989 | Suzuyama | 361/341 |
| 5,453,910 | 9/1995 | Itou | 361/612 |

FOREIGN PATENT DOCUMENTS

| | | | |
|---|---|---|---|
| 0129216 | 12/1984 | European Pat. Off. | |
| 2029292 | 10/1970 | France. | |
| 2392487 | 12/1978 | France. | |
| 511890 | 11/1930 | Germany | 361/602 |
| 4-203633 | 7/1992 | Japan. | |

OTHER PUBLICATIONS

"Influence of Earthquakes and Other Loads on the Layout of Gas–Insulated Substations", IEEE Transactions, vol. PAS–103, No. 12, Dec. 1984.

*Primary Examiner*—Gerald P. Tolin
*Attorney, Agent, or Firm*—Burns, Doane, Swecker & Mathis, L.L.P.

[57] ABSTRACT

An earthquake protection device is provided for a gas-insulated switching installation. The gas insulated switching installation has at least one busbar, at least two switch panels, each mounted on a supporting frame, and an arrangement for connecting the supporting frames to a foundation such that at least one of the supporting frames is displaceable at least in a direction of the busbar axis, and extends in a direction of a busbar axis. The at least one displaceable supporting frame is provided with at least one shock absorber, the shock absorber having an active axis in a plane of the supporting frames, the active axis running proximate a center of gravity of at least one of the switch panels.

7 Claims, 3 Drawing Sheets

EARTHQUAKE PROTECTION DEVICE FOR A GAS-INSULATED SWITCHING INSTALLATION

BACKGROUND OF THE INVENTION

1. Field of the Invention

The invention is based on an earthquake protection device for a gas-insulated switching installation.

DISCUSSION OF BACKGROUND

A supporting frame for an assembly of a metal-encapsulated, gas-insulated switching installation is known from Patent Specification EP 0 129 216 B1. This supporting frame rests directly on a foundation, without any intermediate space, and is rigidly connected to this foundation. The supporting frame absorbs all the weight of this assembly and transmits it directly to the foundation. If a plurality of such assemblies are arranged side by side, then they are connected to one another by means of metal-encapsulated busbars. As a rule, if the busbars are beyond a certain structural length, they are provided with length compensators in order to compensate for the mechanical stresses occurring as a result of the heating and cooling which are caused during operation. These compensators must be of pressure-type design so that no insulating gas can escape from the gas-insulated switching installation through them. Such compensators are comparatively expensive components. When designing the gas-insulated switching installation with respect to earthquake safety, particular attention must be paid to the compensators.

The individual assemblies of gas-insulated, metal-encapsulated switching installations, these being the individual switch panels as a rule, are normally of very compact construction are therefore less at risk from earthquake shocks than, for example, conventional open-air switching installations. However, if these gas-insulated switching installations have a relatively large number of assemblies, for example a plurality of supplies and a large number of outlet panels, then the switching installation overall must be designed to be earthquake-proof if it is intended to be installed in a region where there is a risk of earthquakes. In particular, the length compensators installed in the course of the busbars must be protected in a costly manner against possible damage caused by earthquakes.

Furthermore, a supporting frame which is designed to be earthquake-resistant for a switching apparatus is known from Patent Specification US 3,794,277, which supporting frame is held in position by shock absorbers. However, these shock absorbers are not activated until the stress on the supporting frame resulting from earthquake shocks exceeds a predetermined value. Such conventional protection devices against the effects of earthquake shocks are frequently installed between the apparatus to be protected and the foundation supporting it. They are able to protect the switching apparatus against earthquake shocks from any directions and they are used as movement dampers for the oscillating masses which are excited by the earthquakesshocks and in which the kinetic energy of these masses is converted into heat, for example with the aid of friction elements. However, such protection devices frequently have to be examined after an earthquake in order to be fully operational again.

SUMMARY OF THE INVENTION

Accordingly, one object of the invention is to provide a novel earthquake protection device for a gas-insulated switching installation which, in addition to the protection function, also enables compensation for the mechanical stresses occurring in the gas-insulated switching installation as a result of heating and cooling caused by operation.

The advantages achieved by the invention can be seen in that the necessary number of length compensators required in the course of the busbars to compensate for the mechanical stresses occurring as a result of heating and cooling caused by operation is limited to a minimum. These length compensators are comparatively expensive and must be adjusted very carefully during assembly, so that a reduction in their number not only results in economical advantages but also an advantageous reduction in the assembly time required for the gas-insulated switching installation. In addition, the installation of length compensators in the busbars causes an increase in the structural length of the gas-insulated switching installation, so that saving length compensators leads to a gas-insulated switching installation with a shorter length extent. The hydraulic shock brakes require considerably less maintenance outlay than the length compensators, which advantageously reduces the cost of maintenance of the gas-insulated switching installation.

This earthquake protection device is provided for a gas-insulated switching installation. The gas-insulated switching installation has at least one busbar land extends in the direction of the busbar axis. In addition, it has at least two switch panels, which at least one of the at least two supporting frames can be displaced at least in the direction of the busbar axis. The at least one displaceable supporting frame is provided with at least one shock absorber for every possible displacement direction, which shock absorber has an active axis in the plane of the supporting frame. This active axis additionally runs through the center of gravity, projected into the plane of the supporting frame, of the switch panel or past it as close to it as possible.

The gas-insulated switching installation extends in the direction of the busbar axis, it therefore being advantageous that this active axis runs parallel to the direction of the busbar axis.

It is furthermore advantageous that the at least one displaceable supporting frame is provided with at least two shock absorbers which each have an active axis in the plane of the supporting frame, these active axes running parallel to the direction of the busbar axis, and these active axes running on both sides of the center of gravity, projected into the plane of the supporting frame, of the switch panel and, as far as possible, being at the same distance from it.

The at least one shock absorber, by virtue of its operation, offers no significant resistance to comparatively small and comparatively slow displacements of the supporting frame, but blocks the effects of shock-like dynamic stresses such as those of earthquake shocks, for example, on the supporting frame and dissipates force peaks. This blocking is automatically canceled after the stress has decayed.

It has been found to be particularly advantageous for the at least one shock absorber to be designed as a hydraulic shock brake which is connected on the one hand to the supporting frame and on the other hand to the foundation.

The further refinements of the invention are the subject matter of the dependent claims.

The invention, its development and the advantages which can be achieved thereby are described in more detail in the following text with reference to the drawing, which shows only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

All the elements which are not required for immediate understanding of the invention are not illustrated.

DESCRIPTION OF THE PREFERRED EMBODIMENTS

Figure 1:
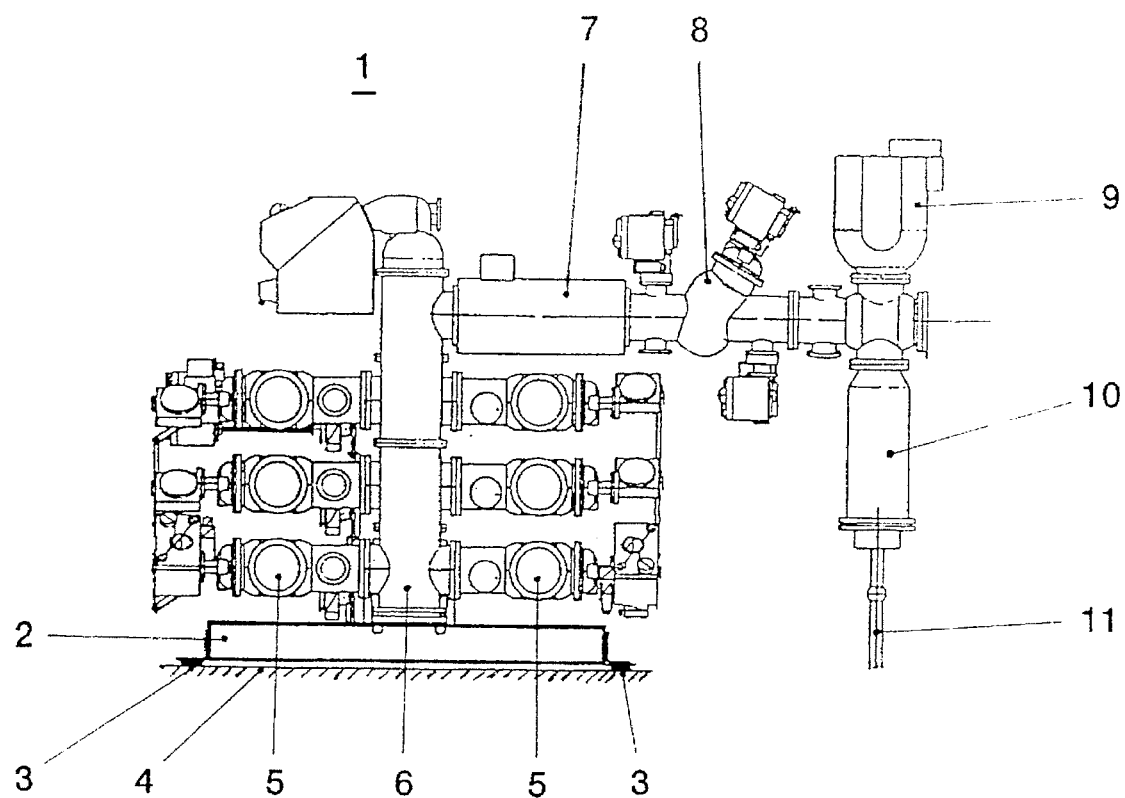
FIG. 1 shows a side view of an outlet panel of a gas-insulated switching installation.
Figure 2:
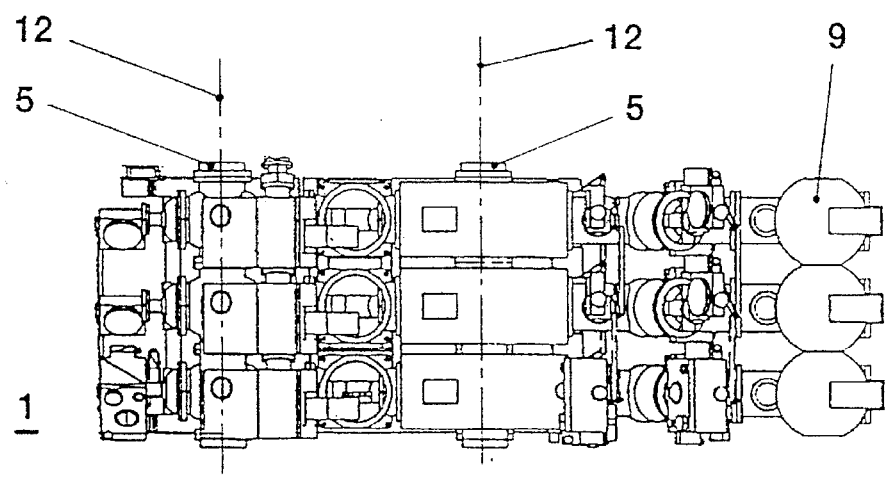
FIG. 2 shows a plan view of an outlet panel of a gas-insulated switching installation.

Referring now to the drawings, wherein like reference numerals designate identical or corresponding parts throughout the several views, FIG. 1 shows a schematically illustrated side view of an outlet panel 1 of a metal-encapsulated, gas-insulated switching installation, and FIG. 2 shows a plan view of this outlet panel 1. This outlet panel 1 has a supporting frame 2, which is manufactured from a metal section. I sections or tubular sections made of steel can be used, for example, as particularly suitable metal sections. As a rule, the tubular profiles have a round or rectangular cross section. Angled sections 3 which are used for connection of the supporting frame 2 to a foundation 4 are fitted to the corners of the supporting frame 2. This connection can be constructed in a force-fitting manner, but can also allow sliding of the supporting frame 2 on a supporting rail which is incorporated in the foundation 4 and is not illustrated here. In the case of this type of metal-encapsulated and gas-insulated switching installation, the busbars 5 are arranged vertically one above the other on one or both sides of the vertically positioned circuit breakers 6. The outlet is provided with a current transformer 7, downstream of which an isolator 8 is connected. A voltage converter 9 is provided downstream of the isolator 8. A cable termination 10 connects the outgoing high-voltage cable 11 to the gas-insulated switching installation. The busbars 5 each have a busbar axis 12. The busbar axes 12 of each of the two busbar systems lie in a plane, vertically one above the other.

Figure 3:
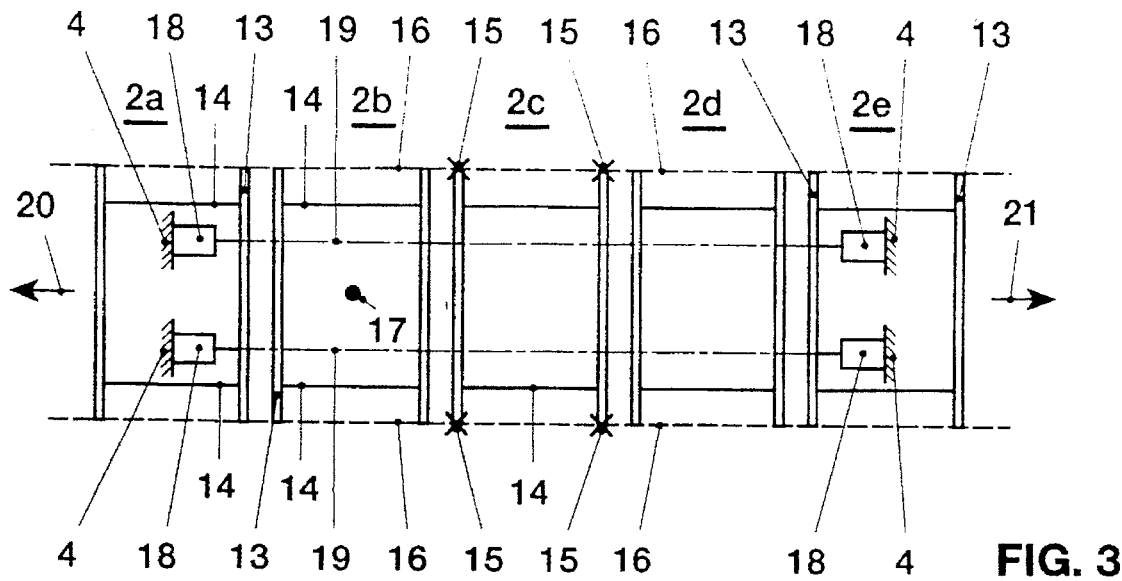
FIG. 3 shows a first schematic illustration of the arrangement of the supporting frames of a gas-insulated switching installation.

FIG. 3 shows a first schematic illustration of the arrangement of the supporting frames 2a to 2e of a gas-insulated switching installation which has, for example, five switch panels. Each of the supporting frames 2a to 2e has two crossmembers 13, which are connected by means of two transverse supports 14. In the case of this exemplary embodiment, the center supporting frame 2c is rigidly connected to the foundation 4, as the crosses 15 at the corners of this frame indicate. The other supporting frames 2a, 2b, 2d and 2e are in each case connected at their corners to a supporting rail 16, which is indicated by lines which are drawn dashed. These supporting rails 16 are permanently incorporated in the foundation 4, parallel to one another. The supporting frames 2a, 2b, 2d and 2e are connected to the supporting rails 16 such that they can slide on the supporting rails 16 in the direction of said supporting rails 16 when corresponding forces act on this supporting frame 2. In this case, any movement in other directions is precluded. The direction of the busbar axes 12 runs parallel to the direction of the supporting rails 16. The center of gravity 17, projected into the plane of the supporting frame, of the switch panel which is supported by the supporting frame 2b is indicated in this supporting frame 2b. In the case of switch panels of identical or similar construction, their projected center of gravity lies in a similar region of the respective supporting frame, the other centers of gravity 17 therefore not being shown here. Two hydraulic shock brakes 18 are installed in the outer supporting frame 2a, between the foundation 4 and one of the crossmembers 13, such that their active axes 19 run parallel to the busbar axis and at the same distance from the centers of gravity 17 on both sides. Two hydraulic shock brakes 18 are installed in the outer supporting frame 2e, between the foundation 4 and one of the crossmembers 13, such that their active axes 19 run parallel to the busbar axis and at the same distance from the centers of gravity 17 on both sides. An arrow 20 indicates the direction in which the supporting frames 2a and 2b move away from the fixed supporting frame 2c when expansions occur as a result of heating of the switch panels. An arrow 21 indicates the direction in which the supporting frames 2d and 2e move away from the fixed supporting frame 2c when expansions occur resulting from heating of the switch panels. Such a gas-insulated switching installation having comparatively small dimensions can thus be constructed without length compensators in the busbars, provided the latter are not subjected to any excessive temperature fluctuations.

Figure 4:
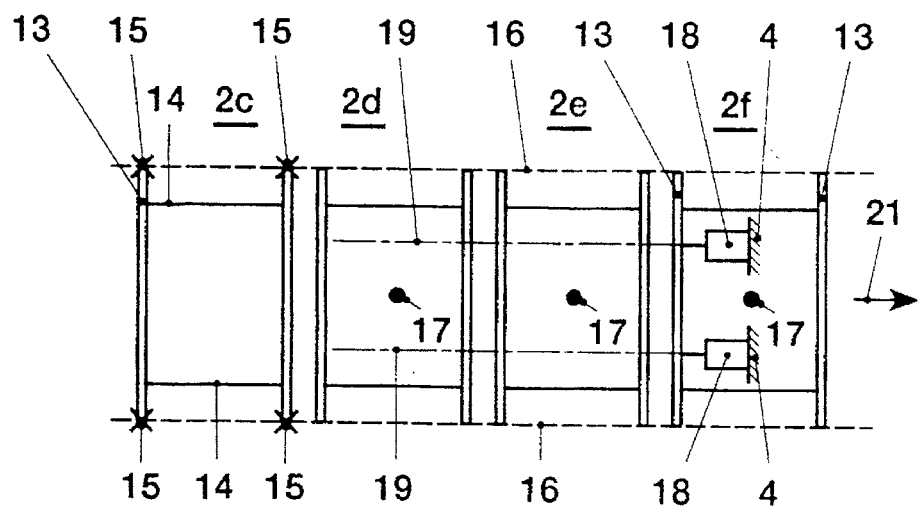
FIG. 4 shows a second schematic illustration of the arrangement of the supporting frames of a gas-insulated switching installation.

FIG. 4 shows a second schematic illustration of the arrangement of the supporting frames 2c to 2f of a gas-insulated switching installation which has, for example, four switch panels. In the case of this exemplary embodiment, which is suitable for a small gas-insulated switching installation, the supporting frame 2c is permanently connected to the foundation 4, as the crosses 15 at the corners of this frame indicate. The other supporting frames 2d, 2e and 2f are each connected at their corners to a supporting rail 16, which is indicated by lines shown dashed. These supporting rails 16 are permanently incorporated in the foundation 4, parallel to one another. The supporting frames 2d, 2e and 2f are connected to the supporting rails 16 such that they can slide on the supporting rails 16 in the direction of said supporting rails 16 when corresponding forces act on these supporting frames. In this case, any movement in other directions is precluded. The direction of the busbar axes 12 runs parallel to the direction of the supporting rails 16. The center of gravity 17, projected into the plane of this supporting frame, of the switch panel, which is supported by the respective supporting frame, is in each case indicated in the supporting frames 2d, 2e and 2f. Only in the outermost supporting frame 2f are two correspondingly dimensioned hydraulic shock brakes 18 installed between the foundation 4 and one of the crossmembers 13 such that their active axes 19 run parallel to the busbar axis and at the same distance from the centers of gravity 17 on both sides. An arrow 21 indicates the direction in which the supporting frames 2d, 2e and 2f move away from the fixed supporting frame 2c when expansions occur as a result of heating of the switch panels.

Figure 5:
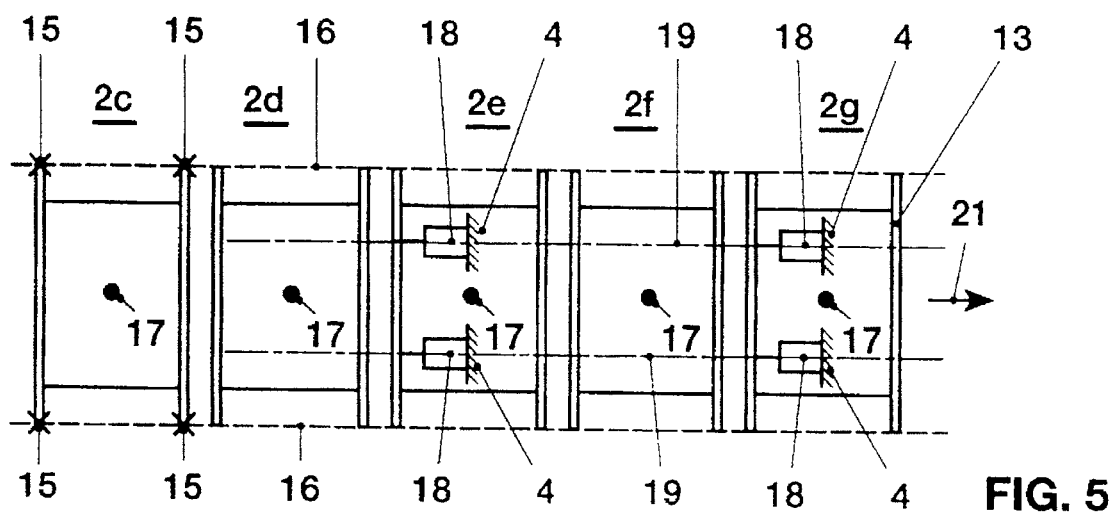
FIG. 5 shows a third schematic illustration of the arrangement of the supporting frames of a gas-insulated switching installation.
Figure 7:
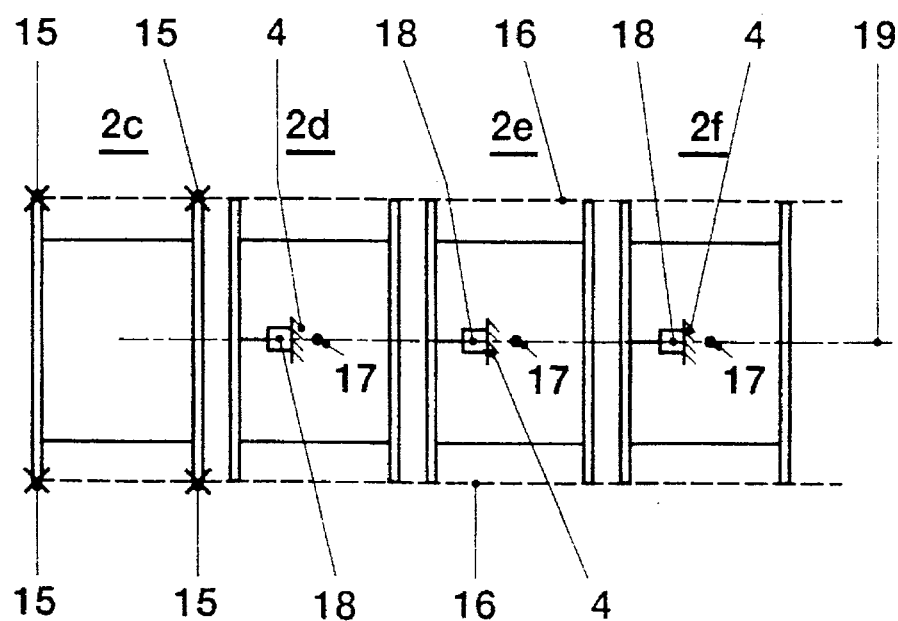
FIG. 7 shows a fifth schematic illustration of the arrangement of the supporting frames of a gas-insulated switching installation.

FIG. 5 shows an arrangement of five supporting frames 2c to 2g, whose construction corresponds to the arrangement according to FIG. 4. In this example, only every other supporting frame, which supporting frames are mounted such that they can slide, namely the supporting frames 2e and 2g, is provided with two hydraulic shock brakes 18. If less powerfully designed types are selected, the hydraulic shock brakes 18 can also be installed in pairs in each of the supporting frames which are mounted such that they can slide. A large number of types of shock brakes are available, so that economically and effectively optimum equipment with hydraulic shock brakes 18 can be selected for any gas-insulated switching installation. In the case of the installation of the hydraulic shock brakes 18, the spatial conditions, which are frequently highly confined, can also be taken into account in a suitable manner. In particular, it should be mentioned here that it is always possible, as is shown in FIG. 7, to install the shock brakes 18 individually instead of in the paired installation of the hydraulic shock brakes 18, but these hydraulic shock brakes 18 must then be installed such that their active axis 19 passes through the centers of gravity 17, projected into the plane of the supporting frames 2c to 2f, or such that it runs at least as close as possible to these centers of gravity 17.

Figure 6:
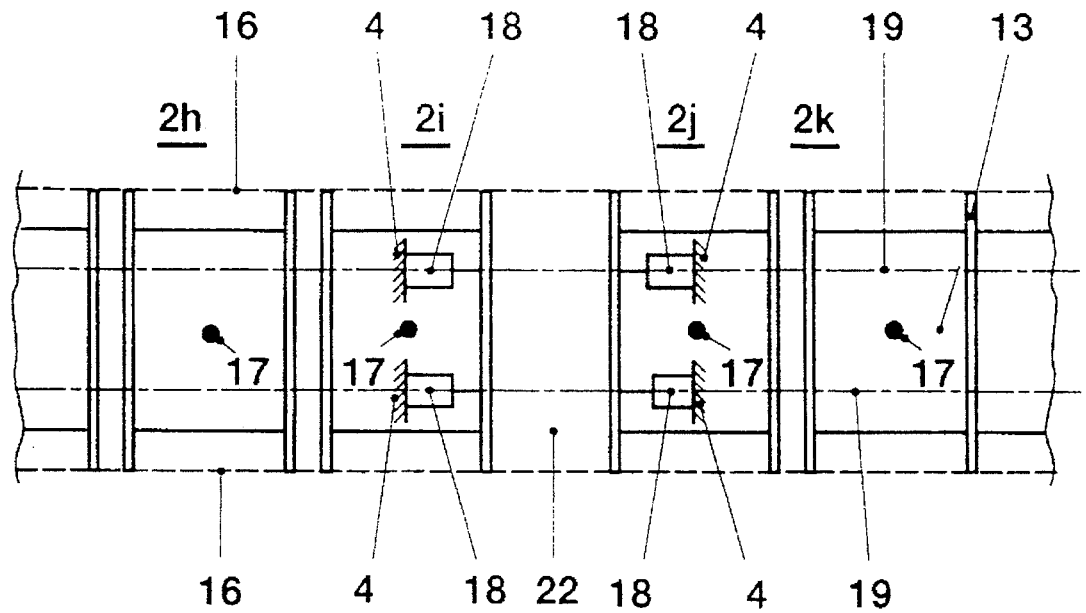
FIG. 6 shows a fourth schematic illustration of the arrangement of the supporting frames of a gas-insulated switching installation.

In the case of metal-encapsulated, gas-insulated switching installations having a comparatively large number of switch panels, as a rule it is not possible to dispense completely with length compensators in the busbars. One length compensator per busbar is not required, when hydraulic shock brakes 18 are used in this installation, until a comparatively large number of switch panels is reached. FIG. 6 illustrates the principle of the installation of a length compensator. An intermediate space 22 is necessary between the switch panels which are adjacent to the length compensator and are illustrated by the supporting frames 2i and 2j, in order to create space for the length compensator. The supporting frames 2h to 2k are in each case connected at their corners to a supporting rail 16, which is indicated by lines shown dashed. These supporting rails 16 are permanently incorporated in the foundation 4, parallel to one another. The supporting frames 2h to 2k are connected to the supporting rails 16 such that they can slide on the supporting rails 16 in the direction of said supporting rails 16 when corresponding forces act on these supporting frames. In this case, any movement in other directions is precluded. The direction of the busbar axes 12 runs parallel to the direction of the busbars 16. Two hydraulic shock brakes 18 are installed in each of the supporting frames 2i and 2k, between the foundation 4 and one of the crossmembers 13, such that their active axes 19 run parallel to the busbar axis and at the same distance from the centers of gravity 17 on both sides. In this way, the length compensator is directly protected against earthquake shocks.

The hydraulic shock brake 18 offers no significant resistance to comparatively slow displacements of the supporting frames 2 caused by operation. Temperature-dependent expansions and contractions of the housings of the gas-insulated switching installation can be regarded as displacements caused by operation, in this case. However, as soon as a shock-like dynamic stress, for example earthquake shocks, acts on the hydraulic shock brake 18, this instantaneously blocks and becomes an approximately rigid connection. This rigid connection passes the movement energy acting at this point into the foundation 4, so that said energy can no longer act on the gas-insulated switching installation. The hydraulic shock brake 18 essentially comprises a piston-cylinder arrangement in the case of which a specially constructed valve allows the hydraulic fluid to flow comparatively slowly from a volume in front of the piston into a space behind the piston, and vice versa. If the piston is connected for example, to the supporting frame, and the cylinder of the described arrangement is connected to the foundation 4, then a small continuous stress, which is produced, for example, by thermal expansions acting on the supporting frame 2, acts via the supporting frame 2 on the piston, and the piston presses against the hydraulic liquid, which relieves the pressure through the specially constructed valve and, for example, flows slowly out of the volume in front of the piston into the space behind the piston. However, if the supporting frame 2 is stressed in a shock-like manner, then the specially constructed valve immediately blocks this outward flow.

In the event of blocking, a cushion composed of hydraulic fluid is formed in the hydraulic shock brake 18, which cushion is compressible to a certain extent and dissipates the hazardous force peaks produced by the movement energy. In the case of shock-like dynamic stresses, the hydraulic shock brake 18 accordingly acts like an additional support for the support frame 2, but this addition support brings with it the advantage that, in addition, it dissipates hazardous force peaks to safe levels without having to deform permanently and plastically. After the shock-like dynamic stresses have decayed, the blocking is automatically canceled again and the slow movement, which takes place at the same time, for example, and is caused by temperature influences, of the supporting frame 2 can proceed again without any significant resistance. The effect of the hydraulic shock brake 18 acts along the active axis 19, and acts in the same manner in the two possible directions. The effect is reversed without any delay. Hydraulic shock brakes from the LISEGA GmbH. Company P.O. Box 1357, D-27393 Zeven, Germany have been proven for use with gas-insulated switching installations.

Designs of gas-insulated switching installations are also conceivable in which one or more of the switch panels is or are installed such that they can move in more than one direction. If these switch panels are intended to be protected against shock-like dynamic stresses, then the respective supporting frame must be provided with in each case at least one hydraulic shock brake for each of the directions which are possible for the associated switch panel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An earthquake protection device for a gas-insulated switching installation, comprising:

a gas-insulated switching installation having at least one busbar the busbar having a busbar axis, the switching installation having at least two switch panels and at least two supporting frames, each of the switch panels being mounted on a respective one of the supporting frames;

means for connecting the supporting frames to a foundation such that one or more supporting frames are displaceable supporting frames, the displaceable supporting frames being displaceable relative to at least part of the connecting means at least in a direction of the busbar axis;

at least one shock absorber associated with the displaceable supporting frames, the shock absorber having an active axis lying in a plane of the supporting frames; and the active axis extending proximate a center of gravity of at least one of the switch panels.

2. The earthquake protection device as claimed in claim 1, wherein the active axis extends parallel to the direction of the busbar axis.

3. The earthquake protection device as claimed in claim 1, wherein the displaceable supporting frames are provided with at least two shock absorbers, the shock absorbers each having an active axis lying in the plane of the supporting frames, and the active axes extend on opposite sides of a center of gravity of at least one of the switch panels and are substantially equidistant from the center of gravity.

4. The earthquake protection device as claimed in claim 3, wherein the active axes extend parallel to the direction of the busbar axis.

5. The earthquake protection device as claimed in claim 1, wherein resistance of the at least one shock absorber increases with increasing size and speed of displacement of the supporting frames.

6. The earthquake protection device as claimed in claim 5, wherein the at least one shock absorber is a hydraulic shock brake.

7. The earthquake protection device as claimed in claim 6, wherein the hydraulic shock brake is connected on the one hand to the supporting frames and on the other hand to the foundation.

* * * * *